(12) United States Patent
Shi et al.

(10) Patent No.: US 12,726,395 B2
(45) Date of Patent: Sep. 1, 2026

(54) WIRELESS COMMUNICATION DEVICE AND METHOD FOR IQ CALIBRATION

(71) Applicant: TP-Link Systems Inc., Irvine, CA (US)

(72) Inventors: Jifu Shi, Shenzhen (CN); Yaoqiang Wang, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 43 days.

(21) Appl. No.: 18/827,831

(22) Filed: Sep. 8, 2024

(65) Prior Publication Data

US 2026/0074944 A1 Mar. 12, 2026

(51) Int. Cl.
*H04L 27/36* (2006.01)
*H04L 27/34* (2006.01)
*H04L 27/38* (2006.01)

(52) U.S. Cl.
CPC ........ *H04L 27/364* (2013.01); *H04L 27/3461* (2013.01); *H04L 27/38* (2013.01)

(58) Field of Classification Search
CPC .... H04L 27/3461; H04L 27/364; H04L 27/38
See application file for complete search history.

(56) References Cited

U.S. PATENT DOCUMENTS 6,566,948 B1 * 5/2003 Braithwaite .......... H03F 1/3247 330/136
8,615,059 B2 * 12/2013 Mikhemar .......... H04L 27/0014 375/346
9,680,671 B2 6/2017 Noest et al.
10,116,485 B1 * 10/2018 Liu ...................... H04B 17/354
10,979,262 B2 4/2021 Tangudu et al.
2014/0064406 A1 3/2014 Onishi
2015/0229497 A1 8/2015 Dhayni

FOREIGN PATENT DOCUMENTS

CN 110661546 A 1/2020

* cited by examiner

*Primary Examiner* — David B Lugo
(74) *Attorney, Agent, or Firm* — Loeb & Loeb LLP

(57) ABSTRACT

A wireless communication device and a method for IQ calibration are provided. The device includes a transmitting unit for generating a set of RF transmitting signals based on a set of digital baseband signals, each of the set of RF transmitting signals has IQ components; a receiving unit for generating a set of digital feedback signals based on a set of RF receiving signals obtained from the set of RF transmitting signals; a processing unit for obtaining a first set of compensation coefficients for the transmitting unit and a second set of compensation coefficients for the receiving unit based on the set of digital baseband signals and the set of digital feedback signals with an IQ calibration model, the IQ calibration model includes a first high-order term set about a nonlinear error in the transmitting unit and a second high-order term set bout a nonlinear error in the receiving unit.

18 Claims, 5 Drawing Sheets

WIRELESS COMMUNICATION DEVICE AND METHOD FOR IQ CALIBRATION

TECHNICAL FIELD

The present disclosure relates to wireless communication, and more particularly, to a method for IQ calibration and a wireless communication device that performs the method.

BACKGROUND

In wireless communication systems, particularly those involving modulation schemes, an IQ modulator is an essential element used for modulating service data onto a radio frequency (RF) carrier. The IQ modulator works by splitting a signal into two components: the in-phase (I) component and the quadrature-phase (Q) component (hereinafter referred to as IQ components). These components are then independently modulated and combined to form a complex signal that carries the service data. IQ imbalance occurs when there is a mismatch between the amplitude and/or phase of the I and Q components. This imbalance may degrade the performance of the modulator and demodulator, leading to increased signal error and reduced signal quality.

IQ calibration is a technique for mitigating the IQ imbalance that relies on correcting the imbalance by adjusting the amplitude and phase of the I and Q components. However, the current IQ calibration methods primarily use a simple signal statistics algorithm to estimate the magnitude and phase imbalance factors for the I/Q imbalance. These methods may be adequate for simple scenarios with low calibration requirements but are inadequate for complex scenarios that require high calibration accuracy.

SUMMARY

In view of the above problems, the present disclosure provides IQ calibration techniques that can jointly calibrate the IQ imbalance that occurs in a transmitting unit and a receiving unit in the wireless communication device while improving the IQ calibration accuracy.

According to an aspect of the present disclosure, a wireless communication device is provided. The wireless communication device comprises: a transmitting unit configured to generate a set of radio frequency (RF) transmitting signals based on a set of digital baseband signals, each of the set of RF transmitting signals has IQ components; a receiving unit configured to generate a set of digital feedback signals based on a set of RF receiving signals obtained from the set of RF transmitting signals; and a processing unit configured to obtain a first set of compensation coefficients for the transmitting unit and a second set of compensation coefficients for the receiving unit based on the set of digital baseband signals and the set of digital feedback signals with an IQ calibration model, wherein the IQ calibration model comprises a first high-order term set associated with a nonlinear error in the transmitting unit and a second high-order term set associated with a nonlinear error in the receiving unit.

According to an aspect of the present disclosure, a method for IQ calibration performed by a wireless communication device is provided. The wireless communication device comprises a transmitting unit, a receiving unit and a processing unit and the method comprises: generating, by the transmitting unit, a set of radio frequency (RF) transmitting signals based on a set of digital baseband signals, each of the set of RF transmitting signals has IQ components: generating, by the receiving unit, a set of digital feedback signals based on a set of RF receiving signals obtained from the set of RF transmitting signals; and obtaining, by the processing unit, a first set of compensation coefficients for the transmitting unit and a second set of compensation coefficients for the receiving unit based on the set of digital baseband signals and the set of digital feedback signals with an IQ calibration model, wherein the IQ calibration model comprises a first high-order term set associated with a nonlinear error in the transmitting unit and a second high-order term set associated with a nonlinear error in the receiving unit.

According to an aspect of the present disclosure, a computer program product is provided. The computer program product comprises computer-readable medium storing instructions thereon, when executed by a processor of a wireless communication device causes the wireless communication device: generating, by a transmitting unit of the wireless communication device, a set of radio frequency (RF) transmitting signals based on a set of digital baseband signals, each of the set of RF transmitting signals has IQ components: generating, by the receiving unit of the wireless communication device, a set of digital feedback signals based on a set of RF receiving signals obtained from the set of RF transmitting signals; and obtaining, by the processor, a first set of compensation coefficients for the transmitting unit and a second set of compensation coefficients for the receiving unit based on the set of digital baseband signals and the set of digital feedback signals with an IQ calibration model, wherein the IQ calibration model comprises a first high-order term set associated with a nonlinear error in the transmitting unit and a second high-order term set associated with a nonlinear error in the receiving unit.

The wireless communication device according to the present disclosure can jointly calibrate the IQ imbalance that occurs both in the transmitting unit and the receiving unit with a single calibration process. This take account of interdependencies between the transmitting and receiving unit, thereby bringing at least one of increased calibration efficiency, cost saving and improved IQ calibration accuracy. Furthermore, the IQ calibration model according to the present disclosure use higher-order terms that model the nonlinear errors associated with the transmitting unit and the receiving unit, which increases IQ calibration accuracy, resulting in enhanced signal quality and better overall performance. These advantages enable the wireless communication device according to the present disclosure to be suitable for complex scenarios that demand high calibration accuracy.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure but do not constitute a limitation on the present disclosure. In the drawings, unless otherwise explicitly indicated, the same reference numerals refer to the same components, steps or elements.

DETAILED DESCRIPTION

Figure 1:
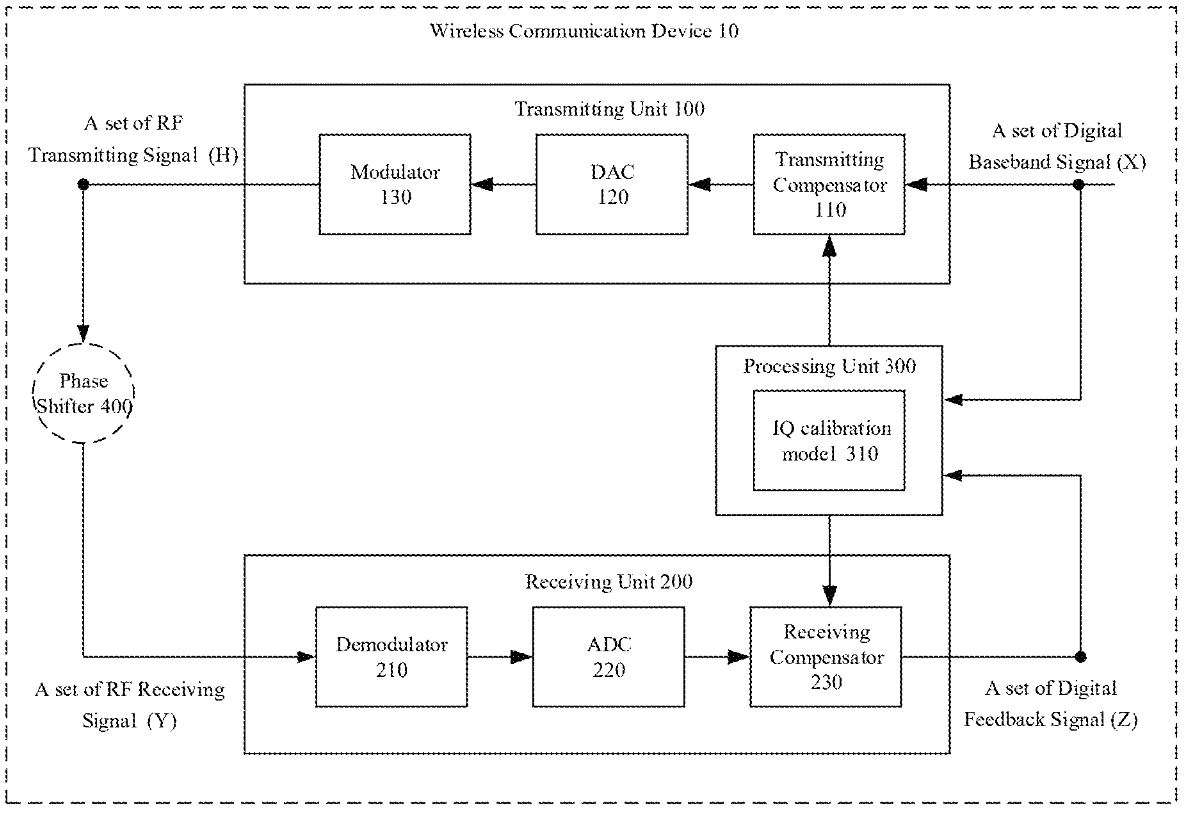
FIG. 1 is a diagram illustrating an example wireless communication device according to an embodiment of the present disclosure.

The technical solution of the present disclosure will be clearly and completely described below in conjunction with accompanying drawings. The described embodiments are part of embodiments of the present disclosure, but not all of them. Based on the embodiments in the present disclosure, all other embodiments acquired by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined as long as no conflicts occur therebetween.

Some of the drawings may not depict all the components of a given method, device and system. Like reference numerals may be used to denote like features throughout the specification and drawings.

FIG. 1 is a diagram illustrating an example wireless communication device according to an embodiment of the present disclosure.

Referring to FIG. 1, the wireless communication device 10 according to an embodiment of the present disclosure may be or be a part of an access point (AP) or other devices that can wirelessly transmit and receive data.

As previously described, an IQ modulator may be used to split a signal into IQ components and independently modulate the IQ components during the data transmission. Accordingly, an IQ demodulator may accordingly be used to independently demodulate the IQ components during the data reception. IQ imbalance occurs due to a mismatch between the amplitude or phase of the IQ components during the modulation and the demodulation.

The IQ calibration may be performed prior to the start of data transmission and data reception to determine an appropriate compensation coefficient to be used to compensate for the IQ mismatch during the data transmission and the data reception. The determined compensation coefficients allow the IQ image to be mitigated or even eliminated during data transmission and data reception.

As shown in FIG. 1, the wireless communication device 10 may comprise a transmitting unit 100, a receiving unit 200 and a processing unit 300.

The transmitting unit 100 may generate a set of RF transmitting signals $H=\{h_1, h_2, \ldots, h_k\}$ based on a set of digital baseband signals $X=\{x_1, x_2, \ldots, x_k\}$. The series of signals $x_1, x_2, \ldots, x_k$ in the set of digital baseband signals X may be generated by the wireless communication device 10 in a time sequence or received by the wireless communication device 10 from an external device in a time sequence. The set of digital baseband signals X may be dedicated to the IQ calibration.

The receiving unit 200 may receive a set of RF receiving signal $Y=\{y_1, y_2, \ldots, y_k\}$ and generate a set of digital feedback signals $Z=\{z_1, z_2, \ldots, z_k\}$. The respective RF receiving signals $y_1, y_2, \ldots, y_k$ of the set of RF receiving signal Y may be obtained by phase-shifting the respective RF transmitting signals $h_1, h_2, \ldots, h_k$ of the set of the RF transmitting signals H. For example, the RF receiving signal $y_1$ may be obtained by phase-shifting the RF transmitting signal $h_1$. In this case, the phase shifter 400 may exist and the angle by which the RF transmitting signal $h_1$ is phase-shifted is $\phi$, where $0<\phi<360$ degrees. For another example, the RF transmitting signal $h_1$ may be directly received by the receiving unit 200 as the RF receiving signal $y_1$. In this case, the phase shifter 400 may be absent or the phase shifter 400 may exist with $\phi=0$ or 360 degrees.

The processing unit 300 may be coupled to the transmitting unit 100 and the receiving unit 200 to receive the set of digital baseband signals X and the set of the digital feedback signals Z, respectively. The processing unit 300 may be preconfigured with an IQ calibration model 310. The processing unit 300 may obtain the first set of compensation coefficients for the transmitting unit 100 and a second set of compensation coefficients for the receiving unit 200 based on the set of digital baseband signals X and the set of digital feedback signals Z with the IQ calibration model.

The IQ calibration model 310 may be a mathematical model that models the errors in the transmitting path of the transmitting unit 100 and the receiving path of the receiving unit 200. After receiving the the set of digital baseband signals X and the set of digital feedback signals Z as inputs, the mathematical model may be solved using a mathematical method to output the first set of compensation coefficients to be used to compensate for the errors in the transmitting unit 100 and the second set of compensation coefficients to be used to compensate for the errors in the receiving unit 200. The processing unit 300 can then feed the first sets of compensation coefficients to the transmitting unit 100 and the second set of compensation coefficients to the receiving unit 200, respectively.

An exemplary construction of the transmitting unit 100 and the receiving unit 200 is shown in FIG. 1, but this exemplary construction is not intended to limit the present disclosure. Other constructions of the transmitting unit 100 and the receiving unit 200 are also may be used.

In the example of FIG. 1, the transmitting unit 100 may comprise a transmitting compensator 110, a digital-to-analog converter (DAC) 120 and a modulator 130. The set of RF transmitting signal H may be generated by passing the set of digital baseband signals X in turn through the transmitting compensator 110, the DAC 120 and the modulator 130. Before receiving the first set of compensation coefficients from the processing unit 300, the compensation function of the transmitting compensator 110 may be disabled to pass the set of digital baseband signals directly.

In the example of FIG. 1, the receiving unit 200 may comprise a demodulator 210, an analog-to-digital converter (ADC) 220 and a receiving compensator 230. The digital feedback signal Z may be generated by passing the set of RF receiving signal Y through the demodulator 210, the ADC 220 and the receiving compensator 230 in turn. Before receiving the second set of compensation coefficients from the processing unit 300, the compensation function of the receiving compensator 230 may be disabled to pass the set of digital feedback signal Z directly.

As such, the wireless communication device 10 according to the present disclosure can jointly calibrate the IQ imbalance that occurs both in the transmitting unit 100 and the receiving unit 200 with a single calibration process. This take account of interdependencies between the transmitting and receiving unit and reduces the time and effort required compared to separate calibrations for the transmitting and receiving units, thereby providing at least one of increased calibration efficiency, cost saving and improved IQ calibration accuracy.

The IQ calibration model 310 is closely related to the IQ calibration accuracy. The higher the IQ calibration accuracy that the IQ calibration model 310 can achieve, the less effort is required of the hardware of the wireless communication device to improve the calibration accuracy.

In one embodiment according to the present disclosure, the IQ calibration model 310 may comprise a first high-order term set R1 associated with a nonlinear error in the transmitting unit 100 and a second high-order term set R2 associated with a nonlinear error in the receiving unit 200. The IQ calibration model 310 may be expressed as the system of equations (1).

$$\begin{cases} y = e^{j\phi}(x + \vec{\alpha} \otimes x* + R1) \\ z = y + \vec{\beta} \otimes y* + R2 \end{cases} \quad (1)$$

wherein x represents a digital baseband signal of the set of digital baseband signals, and x" represents the conjugate of x; y represents a RF receiving signal of the set of RF receiving signals, and y* represents the conjugation of y; z represents a digital feedback signal of the set of the digital feedback signals; $\vec{\alpha}$ represents the modulation distortion coefficient of the modulator 130; $\vec{\beta}$ represents the demodulation distortion coefficient of the demodulator 210; R1 represents the first high-order term set associated with the nonlinear error in the transmitting unit 100; R2 represents the second high-order term set associated with the nonlinear error in the receiving unit 200; Ø represents the angle by which the set of RF transmitting signal H is phase-shifted to generate the RF receiving signal Y. Ø is zero or 360 degrees when the set of RF receiving signals Y is obtained by directly receiving the set of RF transmitting signals H and Ø is between zero and 360 degrees when the RF receiving signal Y is obtained by phase-shifting the RF transmitting signal H.

Various mathematical algorithms may be used to solve the system of equations (1), such as Least Squares (LS), Weighted Least Squares (WLS), Ridge Regression etc. The present disclosure is not limited thereto.

As such, the wireless communication device 10 according to the present disclosure can further improve the accuracy of the IQ calibration by introducing the first and second higher-order term sets associated with a nonlinear error in the transmitting unit 100 and the receiving unit 200, respectively, thereby enhancing the signal quality and enabling better overall performance of the wireless communication device 10.

The computational resources (e.g., the CPU of the wireless communication device 10) required to solve the IQ calibration model 310 are closely related to the complexity of the first and higher-order term sets. To efficiently use computational resources, the first higher-order term set may comprise only one or more quadratic terms.

In an embodiment according to the present disclosure, the first higher-order term set may comprise terms of: a product of a first coefficient and a square of a real part of an i-th digital baseband signal of the set of the digital baseband signals, a product of a second coefficient and a square of an imaginary part of the i-th digital baseband signal, and a product of a third coefficient, the real part of the i-th digital baseband signal and the imaginary part of the i-th digital baseband signal. The corresponding mathematical expression of the first higher-order term set is shown as the equation (2). Please note that this is not exhaustive, and any construction not listed here that follows the above construction rule can also be used. For example, the one or more "x" in the equation (2) can be replaced by the its conjugate x*.

$$R1 = \mu_1 * \mathrm{real}\ (x_i)^2 + \mu_2 * imag\ (x_i)^2 + \mu_3 * \mathrm{real}\ (x_i) * imag\ (x_i) \quad (2)$$

wherein $x_i$ represents the i-th digital baseband signal of the set of the digital baseband signals X; $\mu_1$, $\mu_2$ and $\mu_3$ represent the first coefficient, the second coefficient and the third coefficient, respectively; $1 \le i \le k$ and k is the number of the digital baseband signal of the set of the digital baseband signals.

Each of the first coefficient, the second coefficient and the third coefficient $\mu_1$, $\mu_2$ and $\mu_3$ is constant and may be zero.

Preferably, the first higher-order term set may further comprise a historical term to take account of dynamics or temporal errors that may occur in the transmitting unit 100.

For example, the historical term in the first higher-order term set may be a product of a fourth coefficient, one of the real part of the i-th digital baseband signal and the imaginary part of the i-th digital baseband signal, and one of the real part of a j-th digital baseband signal of the set of the digital baseband signals and the imaginary part of the j-th digital baseband signal. An example mathematical expression in this example is shown as equation (3) below.

$$R1 = \mu_1 * \mathrm{real}\ (x_i)^2 + \mu_2 * imag\ (x_i)^2 + \mu_3 * \mathrm{real}\ (x_i) * imag\ (x_i) + \mu_4 * \mathrm{real}\ (x_i) * \mathrm{real}\ (x_j)$$

wherein $x_i$ represents the i-th digital baseband signal of the set of the digital baseband signals X; $x_j$ represents the j-th digital baseband signal of the set of the digital baseband signals X; $\mu_1$, $\mu_2$, $\mu_3$, $\mu_4$ represent the first coefficient, the second coefficient, the third coefficient and the fourth coefficient, respectively; $1 \le j < i \le k$ and k is the number of the digital baseband signal of the set of the digital baseband signals X.

As previously described, the series of signals $x_1$, $x_2$, . . . , $x_k$ are generated or received in a time sequence, so that the $x_j$ is generated or received before $x_i$. By comprising the historical term "$\mu_4$*real($x_i$)*real($x_j$)", the dynamics or temporal errors that may occur between the generation time of $x_i$ and the generation time of $x_j$ in the transmitting unit 200 are taken into account, thereby finally further improving the IQ calibration accuracy.

It should be understood that the "real($x_i$)" in the above historical term can be replaced by "imag($x_i$)" and the "real ($x_j$)" in the above historical term may be replaced by "imag($x_j$)". The first high-order term set may also comprise one or more other historical terms constructed in this way.

Similar to the first high-order term set, the second higher-order term set comprises terms of: a product of the fifth coefficient and the square of the real part of the i-th RF receiving signal of the set of the RF receiving signals, a product of a sixth coefficient and a square of an imaginary part of the i-th RF receiving signal, and a product of a seventh coefficient, the real part of the i-th RF receiving signal and the imaginary part of the i-th RF receiving signal. The corresponding mathematical expression of the second higher-order term set is shown as the equation (4). Please note that this is not exhaustive, and any construction not listed here that follows the above construction rule may also be used. For example, the one or more "y" in the equation (2) can be replaced by the its conjugate y*.

$$R2 = \mu_5 * \text{real }(y_i))^2 + \mu_6 * imag\,(y_i)^2 + \mu_7 * \text{real }(y_i) * imag\,(y_i) \tag{4}$$

wherein $y_i$ represents the i-th RF receiving signal of the set of the RF receiving signal Y; $\mu_5$, $\mu_6$ and $\mu_7$ represent the fifth coefficient, the sixth coefficient and the seventh coefficient, respectively; $1 \le i \le k$ and k is the number of the digital baseband signal of the set of the digital baseband signals.

Each of the fifth coefficient, the sixth coefficient and the seventh coefficient $\mu_5$, $\mu_6$ and $\mu_7$ is constant and can be zero.

Preferably, the second higher-order term set may further comprise a historical term to take account of the dynamics or temporal errors that may occurs in the receiving unit 200.

For example, the historical term in the second higher-order term set may be a product of an eighth coefficient, one of the real part of the i-th RF receiving signal and the imaginary part of the i-th RF receiving signal, and one of a real part of a j-th RF receiving signal of the set of the RF receiving signals and the imaginary part of the j-th RF receiving signal. An example mathematical expression in this example is shown as equation (5) below.

$$R2 = \mu_5 * \text{real }(y_i))^2 + \mu_6 * imag\,(y_i)^2 + \mu_7 * \text{real }(y_i) * imag\,(y_i) + \mu_8 * real(y_i) * real(y_j) \tag{5}$$

wherein $y_i$ represents the i-th RF receiving signal of the set of the RF receiving signal Y; $\mu_5$, $\mu_6$, $\mu_7$, $\mu_8$ represent the fifth coefficient, the sixth coefficient, the seventh coefficient and the eighth coefficient, respectively; $1 \le j < i \le k$; and k is the number of the RF receiving signal of the set of the RF receiving signals and is equal to the number of the digital baseband signal of the set of the digital baseband signals.

By comprising the historical term "$\mu_8$*real($y_i$)*real($y_j$)", the dynamics or temporal errors that may occur between the generation time of $y_i$ and the generation time of $y_j$ in the receiving unit 200 are taken into account, which ultimately further improves the IQ calibration accuracy.

It should be understood that the "real($y_i$)" in the above historical term can be replaced by "imag($y_i$)" and the "real ($y_j$)" in the above historical term can be replaced by "imag ($y_j$)". The second high-order term set may also comprise one or more other history items constructed in this way.

As such, the IQ calibration model 310 according to the present disclosure may further model the dynamics or temporal errors that may occur in the transmitting unit 100 and/or the receiving unit 200. Thus, the wireless communication device according to the present disclosure may achieve a higher calibration accuracy.

Given that the first higher-order term set is constructed as the equation (2) and and the second higher-order term set is constructed as the equation (4), the system of the equations (1) can be equivalent to the system of equations (6):

$$\begin{cases} y_i = e^{j\phi}\big(x_i + \vec{\alpha} \otimes x_i * + \mu_1 * \text{real }(x_i)^2 + \\ \mu_2 * imag\,(x_i)^2 + \mu_3 * \text{real }(x_i) * imag\,(x_i)\big) \\ z_i = y_i + \vec{\beta} \otimes y_i * + \mu_5 * \text{real }(y_i)^2 + \\ \mu_6 * imag\,(y_i)^2 + \mu_7 * \text{real }(y_i) * imag\,(y_i) \end{cases} \tag{6}$$

The first set of compensation coefficients comprises the modulation distortion coefficient $\vec{\alpha}$, the first coefficient $\mu_1$, the second coefficient $\mu_2$ and the third coefficient $\mu_3$. The second set of compensation coefficients comprises the demodulation distortion coefficient $\vec{\beta}$, the fifth coefficient $\mu_5$ the sixth coefficient $\mu_6$ and the seventh coefficient $\mu_7$. The first and sets of compensation coefficients can be obtained after solving the system of equations (6) and then be fed to the transmitting compensator 110 and the receiving compensator 230, respectively.

As such, by modeling the nonlinear errors in the transmitting unit 100 and the receiving unit 200 using one or more quadratic terms and one or more quadratic terms, respectively, the wireless communication device 10 according to the present disclosure can achieve a high IQ calibration accuracy while using low computational resources.

Preferably, to further improve the IQ calibration accuracy, the direct current (DC) leakage associated with the local oscillator (LO) that may occur in the transmitting unit 100 and the receiving unit 200 can be take into account. The DC leakage refers to an unintended emission of the local oscillator signal into the carrier signal, resulting in interference to the carrier signal and degradation of the overall performance of the wireless communication device 10.

In an embodiment according to the present disclosure, the IQ calibration model 310 may further comprise a first constant term associated with the DC leakage in the transmitting unit 100 and/or a second constant term associated with the DC leakage in the receiving unit 200. For example, an example mathematical expression that takes account of the DC leakage in both the transmitting unit 100 and the receiving unit 200 is the following system of equations (7).

$$\begin{cases} y = e^{j\phi}(x + \vec{\alpha} \otimes x* + \mathrm{dc1} + R1) \\ z = y + \vec{\beta} \otimes y* + \mathrm{dc2} + R2) \end{cases} \tag{7}$$

Given that the first higher-order term set is constructed as the equation (2) and and the second higher-order term set is constructed as the equation (4), the system of equations (7) can be equivalent to the system of equations (8):

$$\begin{cases} y_i = e^{j\phi}\big(x_i + \vec{\alpha} \otimes x_i* + \mathrm{dc1}_1 + \mu_1 * \mathrm{real}\ (x_i)^2 + \\ \mu_2 * imag\,(x_i)^2 + \mu_3 * \mathrm{real}\ (x_i) * imag\,(x_i)\big) \\ z_i = y_i + \vec{\beta} \otimes y_i* + \mathrm{dc2} + \mu_5 * \mathrm{real}\ (y_i)^2 + \\ \mu_6 * imag\,(y_i)^2 + \mu_7 * \mathrm{real}\ (y_i) * imag\,(y_i) \end{cases} \tag{8}$$

The first set of compensation coefficients comprises the modulation distortion coefficient $\vec{\alpha}$, the first constant term dc1, the first coefficient $\mu_1$, the second coefficient $\mu_2$ and the third coefficient $\mu_3$. The second set of compensation coefficients comprises the demodulation distortion coefficient $\vec{\beta}$, the second constant term dc2, the fifth coefficient $\mu_5$, the sixth coefficient $\mu_6$ and the seventh coefficient $\mu_7$. The first and sets of compensation coefficients can be obtained after solving the system of equations (8) and then be fed to the transmitting compensator 110 and the receiving compensator 230, respectively.

As such, the IQ calibration model 310 according to the present application may further model the errors due to the DC leakage in the transmitting unit 100 and/or the receiving unit 200. Thus, the IQ calibration accuracy of the wireless communication device 10 can be further improved.

Figure 2:
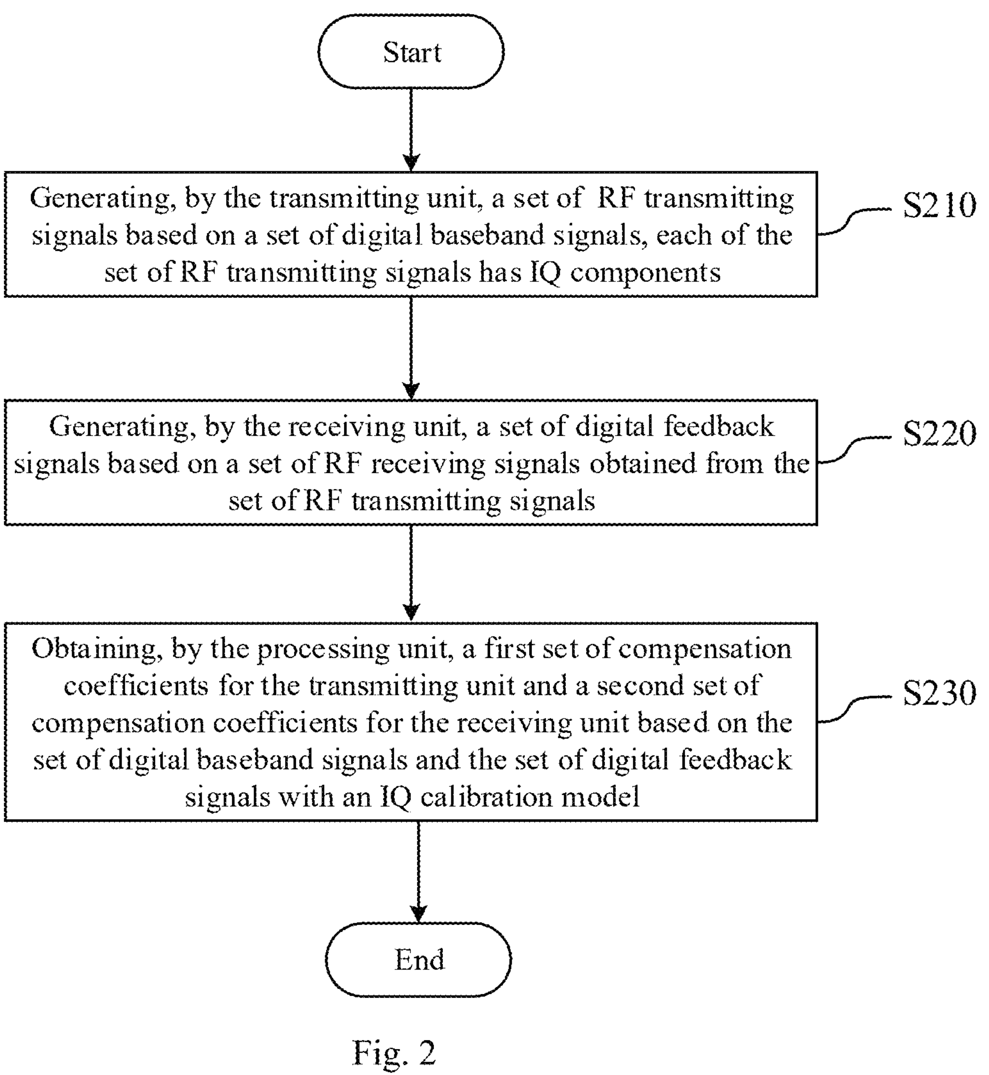
FIG. 2 is a flowchart illustrating the method for IQ calibration according to an embodiment of the present disclosure.

FIG. 2 is a flowchart illustrating the method for IQ calibration according to an embodiment of the present disclosure.

The method 20 may be performed by the wireless communication device 10.

Referring to FIG. 2, the method 20 may comprise steps S210 to S230. In step S210, a transmitting unit (e.g., the transmitting unit 100 of the wireless communication device 10) may generate a set of RF transmitting signals based on a set of digital baseband signals. Each of the set of RF transmitting signals has IQ components. In step S220, a receiving unit (e.g., the receiving unit 200 of the wireless communication device 10) may generate a set of digital feedback signals based on a set of RF receiving signals obtained from the set of RF transmitting signals. As previously described, the RF receiving signal may be obtained by receiving the RF transmitting signal without phase-shifting or by phase-shifting the RF transmitting signal. In step 230, a processing unit (e.g., the processing unit 300 of the wireless communication device 10) may obtain a first set of compensation coefficients for the transmitting unit and a second set of compensation coefficients for the receiving unit based on the set of digital baseband signals and the set of digital feedback signals with an IQ calibration model (e.g., the IQ calibration model 310).

The process of IQ calibration performed by the wireless communication device 10 and the IQ calibration model 310 have been described in connection with FIG. 1, and the steps 210 to 230 of method 20 are not repeated here.

Figure 3A:
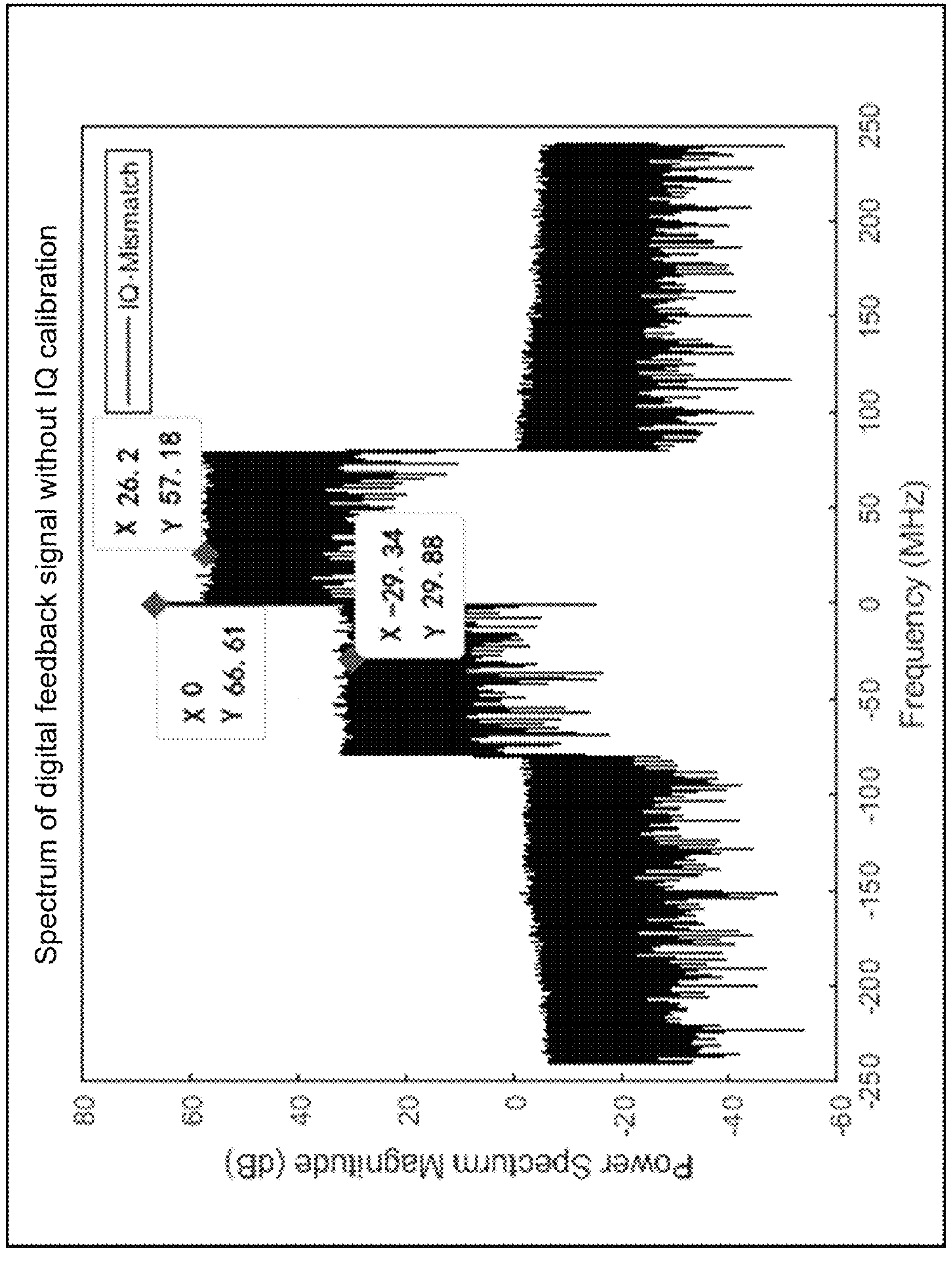
FIG. 3*a* and FIG. 3*b* are diagrams illustrating an example simulation result obtained by using the method for IQ calibration according to an embodiment of the present disclosure.
Figure 3B:
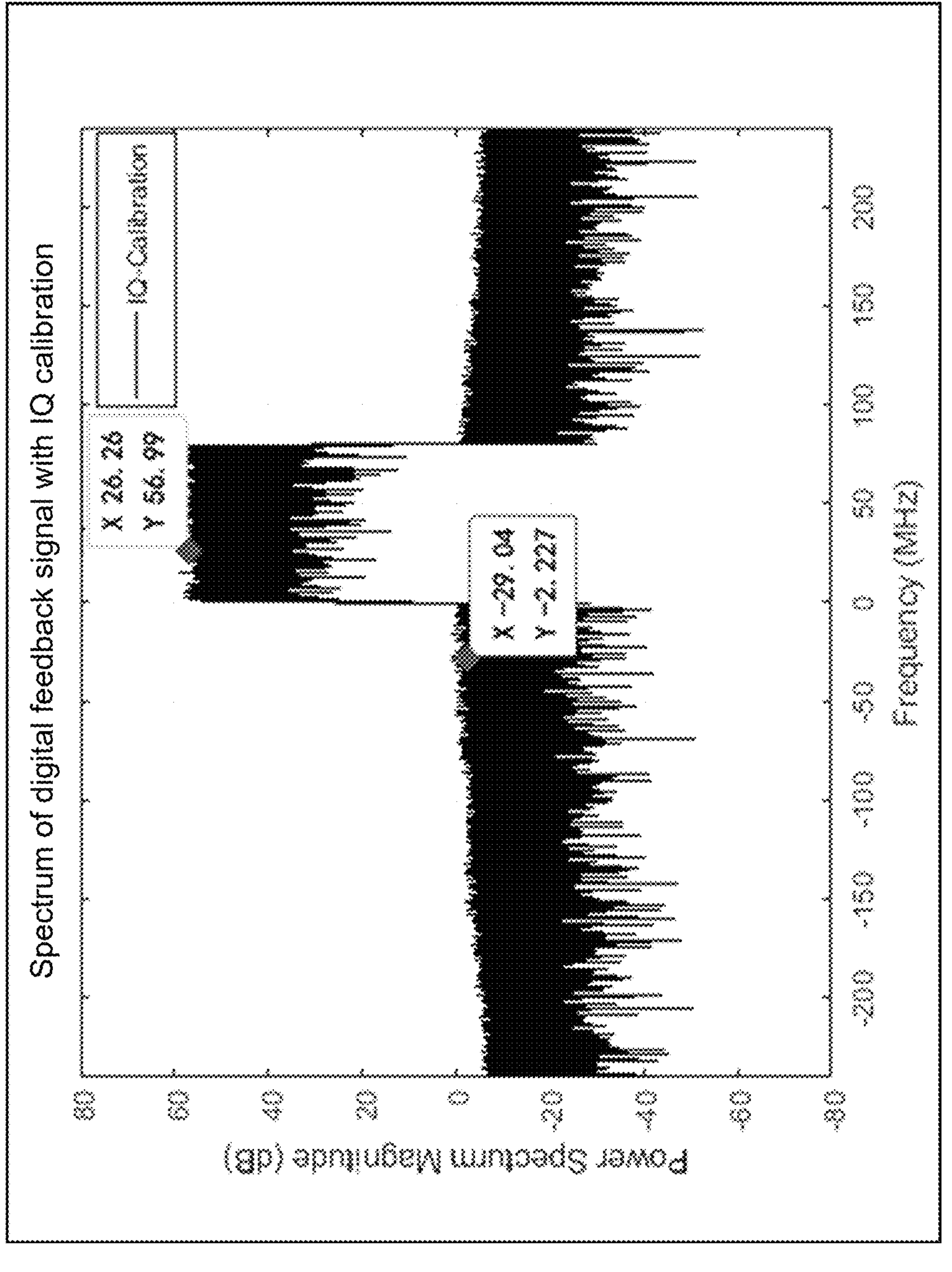

FIG. 3*a* and FIG. 3*b* are diagrams illustrating an example simulation result obtained by using the method for IQ calibration according to an embodiment of the present disclosure.

Referring to FIG. 3*a*, which shows a spectrum of the digital feedback signal generated from a digital baseband signal by the wireless communication device 10 without performing the IQ calibration. The bandwidth and the sampling rate of the spectrum are 80 MHz and 480 MHz, respectively. As shown in FIG. 3*a*, there is a significant IQ image component with center frequency of −40 MHz caused by IQ mismatch in addition to the component of the digital feedback signal with center frequency of 40 MHz. The magnitude of the component of the digital feedback signal is up to 57.18 dB as indicated by the point with coordinate (26.2, 57.18) and the magnitude of the IQ image component is up to 29.88 dB as indicated by the point with coordinate (−29.34, 29.88). FIG. 3*b* shows a spectrum of the digital feedback signal generated from the same digital baseband signal by the wireless communication device 10 with performing the IQ calibration according to the IQ calibration method 20 and using the IQ calibration model as the system of equations (8). The bandwidth and the sampling rate of the digital feedback signal are also 80 MHz and 480 MHz, respectively. Compared with the spectrum as shown in FIG. 3*a*, the IQ image component is basically canceled by the IQ calibration in the spectrum as shown in FIG. 3*b*. This shows that the IQ calibration method 20 according to the present disclosure can achieve high accuracy of IQ calibration.

Figure 4:
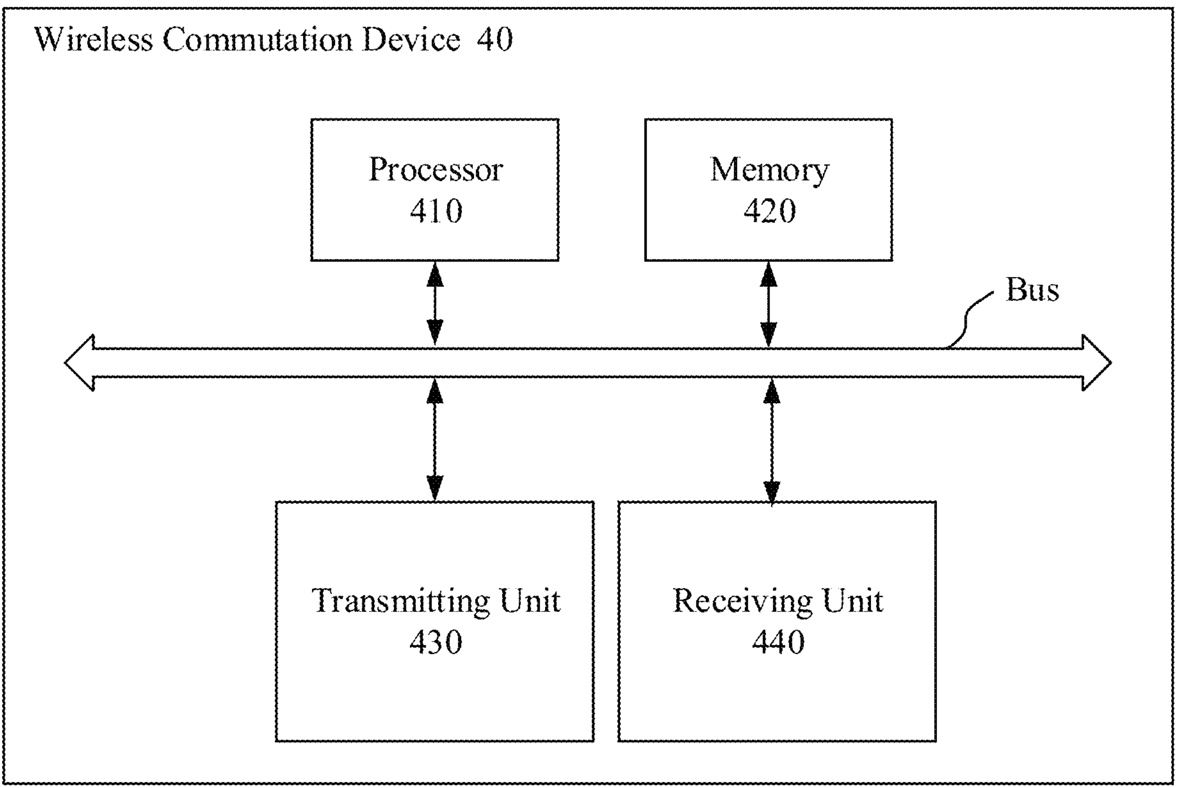
FIG. 4 is an exemplary block diagram illustrating the wireless communication device according to an embodiment of the present disclosure.

FIG. 4 is an exemplary block diagram illustrating the wireless communication device according to an embodiment of the present disclosure.

As shown in FIG. 4, the wireless communication device 40 according to an embodiment of the present disclosure may comprise a processor 410, a memory 420, a transmitting unit 430, receiving unit 440. These components may be coupled together via a communication bus. The memory 420 may store instructions thereon that, when executed by a processor causes the wireless communication device 400 perform the method 20 as previously described.

Examples of processor 410 may comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout the present disclosure.

The processor 410 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 420.

The memory 420 may be a non-transitory computer-readable medium. A non-transitory computer-readable medium comprises, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

In addition, according to another embodiment of the present disclosure, a computer program product for IQ calibration is disclosed. As an example, the computer program product comprises a computer-readable medium having program instructions embodied therewith, and the program instructions are executable by a processor. When executed, the program instructions cause the processor to perform one or more procedures described above. The present disclosure may be a system, a method, and/or a computer program product at any possible technical detail level of integration. The computer program product may comprise a computer-readable storage medium having computer-readable program instructions thereon for causing a processor to carry out aspects of the present disclosure.

The present disclosure may be a system, a method, and/or a computer program product at any possible technical detail level of integration. The computer program product may comprise a computer-readable storage medium having computer-readable program instructions thereon for causing a processor to carry out aspects of the present disclosure.

An expression such as "according to", "based on", "dependent on", and so on as used in the disclosure does not mean "according only to", "based only on", or "dependent only on" unless it is explicitly otherwise stated. In other words, such expression generally means "according at least to", "based at least on", or "dependent at least on" in the disclosure.

The term "determining" used in the disclosure can comprise various operations. For example, regarding "determining", calculating, computing, processing, deriving, investigating, looking up (e.g., looking up in tables, databases, or other data structures), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can comprise the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A wireless communication device, comprising:

a transmitting circuit configured to generate a set of radio frequency (RF) transmitting signals based on a set of digital baseband signals, each of the set of RF transmitting signals has IQ components;

a receiving circuit configured to generate a set of digital feedback signals based on a set of RF receiving signals obtained from the set of RF transmitting signals; and a processing circuit configured to obtain a first set of compensation coefficients for the transmitting circuit and a second set of compensation coefficients for the receiving circuit based on the set of digital baseband signals and the set of digital feedback signals with an IQ calibration model, wherein the IQ calibration model comprises a first high-order term set associated with a nonlinear error in the transmitting circuit and a second high-order term set associated with a nonlinear error in the receiving circuit, wherein the first higher-order term set comprises terms of:

a product of a first coefficient and a square of a real part of an i-th digital baseband signal of the set of the digital baseband signals, a product of a second coefficient and a square of an imaginary part of the i-th digital baseband signal, and a product of a third coefficient, the real part of the i-th digital baseband signal and the imaginary part of the i-th digital baseband signal, wherein $1 \le i \le k$, k is the number of the digital baseband signal of the set of the digital baseband signals, and wherein the first set of compensation coefficients comprises the first coefficient, the second coefficient and the third coefficient.

2. The wireless communication device of claim 1, wherein:

the first higher-order term set also comprises a historical term which is a product of a fourth coefficient, one of the real part of the i-th digital baseband signal and the imaginary part of the i-th digital baseband signal, and one of thea real part of a j-th digital baseband signal of the set of the digital baseband signals and the an imaginary part of the j-th digital baseband signal, wherein $1 \le j < i \le k$.

3. The wireless communication device of claim 1, wherein;

the second higher-order term set comprises terms of:

a product of a fifth coefficient and a square of a real part of an i-th RF receiving signal of the set of the RF receiving signals, a product of a sixth coefficient and a square of an imaginary part of the i-th RF receiving signal, and a product of a seventh coefficient, the real part of the i-th RF receiving signal and the imaginary part of the i-th RF receiving signal, wherein $1 \le i \le k$, k is the number of the RF receiving signal of the set of the RF receiving signals, and the second set of compensation coefficients comprises the fifth coefficient, the sixth coefficient and the seventh coefficient.

4. The wireless communication device of claim 3, wherein;

the second higher-order term set also comprises a historical term which is a product of a eighth coefficient, one of the real part of the i-th RF receiving signal and the imaginary part of the i-th RF receiving signal, and one of a real part of a j-th RF receiving signal of the set of the RF receiving signals and an imaginary part of the j-th RF receiving signal, wherein $1 \leq j < i \leq k$.

5. The wireless communication device of claim 3, wherein;

the IQ calibration model further comprises a first constant term associated with a direct current (DC) leakage in the transmitting circuit; and the first set of compensation coefficients further comprises the first constant term.

6. The wireless communication device of claim 5, wherein:

the IQ calibration model further comprises a second constant term associated with a DC leakage in the receiving circuit; and the second set of compensation coefficients further comprises the second constant term.

7. The wireless communication device of claim 6, wherein the RF receiving signal is obtained by receiving the RF transmitting signal without phase-shifting.

8. The wireless communication device of claim 6, wherein the RF receiving signal is obtained by phase-shifting the RF transmitting signal.

9. The wireless communication device of claim 6, wherein:

the IQ calibration model is:

$$y_i = e^{j\phi}\left(x_i + \vec{\alpha} \otimes x_i * + \mathrm{dc1} + \mu_1 * \mathrm{real}\ (x_i)^2 + \mu_2 * imag\,(x_i)^2 + \mu_3 * \mathrm{real}\ (x_i) * imag\,(x_i)\right)$$

$$z_i = y_i + \vec{\beta} \otimes y_i * + \mathrm{dc2} + \mu_5 * \mathrm{real}\ (y_i)^2 + \mu_6 * imag\,(y_i)^2 + \mu_7 * \mathrm{real}\ (y_i) * imag\,(y_i)\big)$$

wherein $x_i$ represents the i-th digital baseband signal, and $x_i^*$ represents the conjugate of $x_i$; $y_i$ represents the i-th RF receiving signal, and $y_i^*$ represents the conjugation of $y_i$; $z_i$ represents the i-th digital feedback signal of the set of digital feedback signals; $\vec{\alpha}$ represents a modulation distortion coefficient of the transmitting; $\vec{\beta}$ represents a demodulation distortion coefficient of the receiving circuit; real represents acquiring the real part; imag represents acquiring the imaginary part; $\phi$ represents an angle of a phase-shifting; dc1 represents the first constant term, dc2 represents the second constant term, $\mu_1$ to $\mu_3$ represent the first to third coefficients, respectively; and $\mu_5$ to $\mu_7$ represent the fifth to seventh coefficients, respectively.

10. The wireless communication device of claim 1, wherein;

the transmitting circuit comprises a transmitting compensator, a digital-to-analog converter (DAC) and a modulator;

the RF transmitting signal is generated by passing the digital baseband signal through the transmitting compensator, the DAC and the modulator in turn; and the first set of compensation coefficients is to be fed to the transmitting compensator.

11. The wireless communication device of claim 1, wherein:

the receiving circuit comprises a demodulator, an analog-to-digital converter (ADC) and a receiving compensator;

the digital feedback signal is generated by passing the RF receiving signal through the demodulator, the ADC and the receiving compensator in turn; and the second set of compensation coefficients is to be fed to the receiving compensator.

12. A method for IQ calibration performed by a wireless communication device, the wireless communication device comprises a transmitting circuit unit, a receiving circuit and a processing circuit, the method comprising:

generating, by the transmitting circuit, a set of radio frequency (RF) transmitting signals based on a set of digital baseband signals, each of the set of RF transmitting signals has IQ components;

generating, by the receiving circuit, a set of digital feedback signals based on a set of RF receiving signals obtained from the set of RF transmitting signals; and obtaining, by the processing circuit, a first set of compensation coefficients for the transmitting circuit and a second set of compensation coefficients for the receiving circuit based on the set of digital baseband signals and the set of digital feedback signals with an IQ calibration model, wherein the IQ calibration model comprises a first high-order term set associated with a nonlinear error in the transmitting circuit and a second high-order term set associated with a nonlinear error in the receiving circuit, wherein the first higher-order term set comprises terms of:

a product of a first coefficient and a square of a real part of an i-th digital baseband signal of the set of the digital baseband signals, a product of a second coefficient and a square of an imaginary part of the i-th digital baseband signal, and a product of a third coefficient, the real part of the i-th digital baseband signal and the imaginary part of the i-th digital baseband signal, wherein $1 \leq i \leq k$, k is the number of the digital baseband signal of the set of the digital baseband signals, and wherein the first set of compensation coefficients comprises the first coefficient, the second coefficient and the third coefficient.

13. The method of claim 12, wherein:

the first higher-order term set also comprises a historical term which is a product of a fourth coefficient, one of the real part of the i-th digital baseband signal and the imaginary part of the i-th digital baseband signal and one of a real part of a j-th digital baseband signal of the set of the digital baseband signals and an imaginary part of the j-th digital baseband signal, wherein $1 \leq j < i \leq k$.

14. The method of claim 3, wherein:

the second higher-order term set comprises terms of:

a product of a fifth coefficient and a square of a real part of an i-th RF receiving signal of the set of the RF receiving signals, a product of a sixth coefficient and a square of an imaginary part of the i-th RF receiving signal, and a product of a seventh coefficient, the real part of the i-th RF receiving signal and the imaginary part of the i-th RF receiving signal, wherein 1≤i≤k, k is the number of the RF receiving signal of the set of the RF receiving signals, and the second set of compensation coefficients comprises the fifth coefficient, the sixth coefficient and the seventh coefficient.

15. The method of claim 14, wherein;

the second higher-order term set also comprises a historical term which is a product of a eighth coefficient, one of the real part of the i-th RF receiving signal and the imaginary part of the i-th RF receiving signal, and one of a real part of a j-th RF receiving signal of the set of the RF receiving signals and an imaginary part of the j-th RF receiving signal, wherein 1≤j<i≤k.

16. The method of claim 14, wherein:

the IQ calibration model further comprises a first constant term associated with a direct current (DC) leakage in the transmitting circuit ; and the first set of compensation coefficients further comprises the first constant term.

17. The method of claim 16, wherein:

the IQ calibration model further comprises a second constant term associated with a DC leakage in the receiving circuit; and the second set of compensation coefficients further comprises the second constant term.

18. The method of claim 17, wherein the IQ calibration model is:

$$y_i = e^{j\phi}\big(x_i + \vec{\alpha} \otimes x_i * + \mathrm{dc1} + \mu_1 * \mathrm{real}\ (x_i)^2 + \mu_2 * imag\ (x_i)^2 + \mu_3 * \mathrm{real}\ (x_i) * imag\ (x_i)\big)$$

$$z_i = y_i + \vec{\beta} \otimes y_i * + \mathrm{dc2} + \mu_5 * \mathrm{real}\ (y_i)^2 + \mu_6 * imag\ (y_i)^2 + \mu_7 * \mathrm{real}\ (y_i) * imag\ (y_i)\big)$$

wherein $x_i$ represents the i-th digital baseband signal, and $x_i$* represents the conjugate of $x_i$; $y_i$ represents the i-th RF receiving signal, and $y_i$* represents the conjugation of $y_i$; $z_i$ represents the i-th digital feedback signal of the set of digital feedback signals; $\vec{\alpha}$ represents a modulation distortion coefficient of the transmitting circuit; $\vec{\beta}$ represents a demodulation distortion coefficient of the receiving circuit; real represents acquiring the real part; imag represents acquiring the imaginary part; $\phi$ represents an angle of the phase-shifting; dc1 represents the first constant term, dc2 represents the second constant term, $\mu_1$ to $\mu_3$ represent the first to third coefficients, respectively; and $\mu_5$ to $\mu_7$ represent the fifth to seventh coefficients, respectively.

* * * * *